US011059546B1

(12) United States Patent
de Jonge et al.

(10) Patent No.: US 11,059,546 B1
(45) Date of Patent: Jul. 13, 2021

(54) METHOD AND SYSTEM FOR MARINE LOADING, COMPUTER READABLE MEDIUM AND COMPUTER PROGRAM FOR A MARINE LOADING SYSTEM

(71) Applicant: J. de Jonge Beheer B.V., Vlaardingen (NL)

(72) Inventors: Alexander de Jonge, Oostvoorne (NL); Peter Rodenburg, Bergschenhoek (NL); Tiemen Patrick Meester, The Hague (NL)

(73) Assignee: J. de Jonge Beheer B.V., Vlaardingen (NL)

( * ) Notice: Subject to any disclaimer, the term of this patent is extended or adjusted under 35 U.S.C. 154(b) by 0 days.

(21) Appl. No.: 17/270,902

(22) PCT Filed: Sep. 2, 2019

(86) PCT No.: PCT/NL2019/050566
§ 371 (c)(1),
(2) Date: Feb. 24, 2021

(87) PCT Pub. No.: WO2020/050715
PCT Pub. Date: Mar. 12, 2020

(30) Foreign Application Priority Data

Sep. 4, 2018 (NL) .................................. 2021555

(51) Int. Cl.
*B67D 9/02* (2010.01)
*B63B 27/34* (2006.01)
(Continued)

(52) U.S. Cl.
CPC .............. *B63B 27/34* (2013.01); *B63B 27/24* (2013.01); *B67D 9/02* (2013.01); *G06K 9/00214* (2013.01);
(Continued)

(58) Field of Classification Search
CPC ...... B63B 27/34; B63B 27/24; G06K 9/6201; G06K 9/00214; G06K 9/00624; B67D 9/02
See application file for complete search history.

(56) References Cited

U.S. PATENT DOCUMENTS

| 4,758,970 A | * | 7/1988 | Keary | ................... | B67D 7/002 |
| | | | | | 414/141.6 |
| 6,167,607 B1 | | 1/2001 | Pryor | | |

(Continued)

FOREIGN PATENT DOCUMENTS

| EP | 2 671 839 A1 | 12/2013 |
| KR | 2015-0066744 A | 6/2015 |
| WO | 2009/141676 A1 | 11/2009 |

OTHER PUBLICATIONS

PCT Written Opinion and International Search Report, Application No. PCT/NL2019/050566, dated Oct. 25, 2019, 13 pages.

*Primary Examiner* — Jason K Niesz
(74) *Attorney, Agent, or Firm* — Hoffmann & Baron, LLP

(57) ABSTRACT

A method for marine loading includes: providing a marine loading system including: a marine loading arm, a fluid transfer line provided with a coupling device, an actuator being adapted to move the marine loading arm and to position the coupling device and a imaging system for capturing a plurality of images; receiving image data associated with the plurality of images of a scene; constructing, based on the image data, a representation of an object in the scene; determining whether the object represents an open target duct being present in the scene; determining an estimated position of the open target duct with respect to the coupling device or the imaging system; constructing a 3D representation of the open target duct; determining a characteristic property of the open target duct; determining whether the coupling device is compatible with the open (Continued)

target duct; and moving the coupling device towards the open target duct.

28 Claims, 10 Drawing Sheets

(51) Int. Cl.
*B63B 27/24* (2006.01)
*G06K 9/00* (2006.01)
*G06K 9/62* (2006.01)
(52) U.S. Cl.
CPC ....... *G06K 9/00624* (2013.01); *G06K 9/6201* (2013.01)

(56) References Cited

U.S. PATENT DOCUMENTS 10,093,189 B2 * 10/2018 Sommarstrom ......... B25J 9/009
2011/0063121 A1 * 3/2011 Le Devehat ............. B67D 9/02
340/669

* cited by examiner

METHOD AND SYSTEM FOR MARINE LOADING, COMPUTER READABLE MEDIUM AND COMPUTER PROGRAM FOR A MARINE LOADING SYSTEM

CROSS-REFERENCE TO RELATED APPLICATIONS

This application is the National Stage of International Application No. PCT/NL2019/050566, filed Sep. 2, 2019, which claims the benefit of Netherlands Application No. 2021555, filed Sep. 4, 2018, the contents of which is incorporated by reference herein.

FIELD OF THE INVENTION

The invention relates to a method and system for loading and/or unloading a fluid in/from a vessel or ship, also referred to as a marine loading method and system. The invention further relates to a computer readable medium, and a computer program for a marine loading system.

BACKGROUND OF THE INVENTION

Loading and/or unloading of a fluid is an essential process in the operation of a vessel in general, where the fluid may be fuel or water, for example. The vessel may also be a tankship such as an oil tanker or a chemical tanker. Nowadays, the loading and/or unloading of a fluid is often done by marine loading systems comprising a marine loading arm (MLA), that is an alternative to direct hose hookups, and that is particularly useful for larger vessels and transfers at higher loading rates and/or pressures.

A marine loading arm is a mechanical arm comprising an articulated steel structure to transport a fluid product. A fluid product is understood to mean a liquid product or a gaseous product.

A marine loading system comprises a fluid transfer line where one line end is fixed to a base and connected to a tank, and wherein an opposite line end is moveable and provided with a coupling device adapted for connecting to a target duct, itself connected to a fluid tank on a vessel or ship.

A transfer line may comprise one or more rigid or flexible pipes.

Various designs for marine loading systems and marine loading arms exist, and specific installations can be tailored to a given port based on considerations such as vessel size, cargo flow rate and cargo temperature. Environmental constraints, such as the range of tide, wind conditions, and earthquake tolerance, can also affect a choice of system.

To move and position the marine loading arm, the marine loading arm may employ swivel joints and can, to some extent, follow the movement of a moored vessel.

The marine loading system may comprise multiple actuators that allow movement or positioning of the marine loading arm and the coupling device. Also, the actuators may enable the coupling device to be connected, such as clamped, or disconnected, such as unclamped. The actuators may be electric or hydraulic motors, for example.

In some systems, the coupling device is articulated at its end with three degrees of rotational freedom. In this way an angular orientation of a coupling plane of a coupling device relative to the coupling plane of the target duct on a vessel is possible, independent of the inclination of the arm. The coupling plane of the coupling device may remain parallel to the coupling plane of the target duct on approach for the connection to be made, and then, once the coupling device has been connected to the target duct, the articulations enable a 'floating' movement of the connected assembly, following the vessel's movements.

A marine loading system may include add-ons such as hydraulic, electric or manual quick connect couplers, position monitoring systems, emergency release systems, and piggyback vapor return lines.

Although various designs of marine loading systems exist, machine loading arms and coupling devices are generally designed according to the same general principle of operation. In particular, an operator or control system has command to control the actuators enabling controlling the movement and positioning of the marine loading arm and/or the coupling device.

In practice, the actuators are controlled by an operator or a control system, until the coupling device is connected to the target duct. Once the coupling device has been connected to the target duct, the loading arm actuators are disengaged or "set to freewheel" to enable the marine loading system to follow the movements of the target duct without constraining the coupling.

To reduce costs, to reduce the time needed to connect a coupling device and to make the overall marine loading system more safe, reliable and efficient, various improvements to marine loading systems have been proposed. Various improvements aim for an automatic positioning and/or connecting of the coupling device to the target duct, without human interaction in the process of moving the marine loading arm and positioning the coupling device.

EP 2671839 B1 discloses a marine loading arm comprising at least one fluid transfer line having a line end fixed to a base and a moveable line end provided with a coupling adapted for connection to a target duct, the coupling having at least three degrees of freedom relative to the base and at least one member of the group coupling/target duct or a member immediately neighboring one at least of the members of the group coupling/target duct comprising at least one means for providing information on positioning of the coupling; and a control system for the movement and positioning of the coupling, comprising at least three actuators each for controlling the movement of the system in a degree of freedom, wherein each actuators consists of an electric motor and is provided at an articulation of the loading arm providing one of the degrees of freedom, the control system furthermore comprising calculating means adapted to: calculate the relative positioning of the coupling directly relative to the target duct according to the information provided by the positioning information means of the coupling, calculate control instructions to give to each of the electric motors such that their combined movements result in a movement of the coupling aimed at bringing the coupling closer to the target duct, apply said control instructions to bring the coupling closer to the target duct, reiterate the three preceding steps until the coupling is presented in front of the target duct in a position for connection.

Similar to EP 2671839 B1, various other systems and methods have been disclosed to position, possibly automatically, a coupling device relative to a target duct.

A drawback of automating the coupling between a coupling device of a loading arm is that the coupling may fail, even if the positioning can be performed satisfactorily in an automated way, due to incompatibility or deterioration of the coupling device and/or the target duct. This may result in damage or a leaking fluid connection, which is undesirable.

Accordingly, a need remains to improve the automated coupling between a coupling device of a marine loading arm and a target duct on a vessel or ship, whereby a reliability of the automated coupling is increased.

SUMMARY OF THE INVENTION

It would be desirable to provide a marine loading method and system which has an improved reliability.

To better address this concern, in a first aspect of this invention an improved method for marine loading is provided. The method comprises:
providing a marine loading system comprising:
a marine loading arm comprising:
at least one fluid transfer line provided with a coupling device;
at least one actuator being adapted to move the marine loading arm and to position the coupling device;
an imaging system configured to capture a plurality of images, wherein the position and orientation of the imaging system with respect to the coupling device is determinable; and
the method further comprising:
a. receiving, from the imaging system, image data associated with the plurality of images of a scene;
b. constructing, based on the image data, a representation of an object in the scene;
c. determining, based on matching the representation of the object in the scene with a plurality of predetermined representations comprising representations of open target ducts, whether the object represents an open target duct being present in the scene;
d. determining, if it is determined that the open target duct is present in the scene, based on the representation of the open target duct, an estimated position of the open target duct with respect to the coupling device or the imaging system;
e. constructing, based on the image data, a 3D representation of the open target duct;
f. determining a characteristic property of the open target duct, based on matching the 3D representation of the open target duct with a plurality of predetermined 3D representations comprising 3D representations of open target ducts with predetermined characteristic properties;
g. determining, based on the determined characteristic property of the open target duct, whether the coupling device is compatible with the open target duct, wherein a coupling device is compatible with the open target duct if the coupling device is connectable to the open target duct; and
h. moving, if the coupling device is compatible with the open target duct, the coupling device towards the open target duct, based on the estimated position of the open target duct with respect to the coupling device or the imaging system.

The method for marine loading according to the invention is applicable to different types of marine loading systems. However, the considered marine loading systems comprise at least a marine loading arm and an imaging system.

The marine loading system comprises a fluid transfer line provided with a coupling device and at least one actuator being adapted to move the marine loading arm and to position the coupling device. Fluid may refer to a gas or to a liquid. The actuators may comprise electric, pneumatic or hydraulic motors.

The imaging system may comprise a camera, a laser scanner, lidar or other devices that are suitable to provide image data of a scene. The imaging system may comprise a single camera or a plurality of cameras, such as a stereo camera. Typically the scene is selected to comprise a ship, target ducts and other marine related objects.

The captured images and/or the generated image data by the imaging system are used to determine whether an open target duct is present in the scene. To do so, the captured images and/or generated image data are processed. It may be efficient to construct a disparity map comprising an object in the scene. Further filtering the disparity map may provide a representation of the object or a part thereof. The disparity map, which may be filtered, may be used to construct representations of the object, which representations may be 3D. The representation may be a STL model. In case the object is far away or is captured with a relative low resolution the obtained representation of the object may not yet be very accurate. If this is the case, the representation is substantially a 2D representation. It may also be more computationally efficient to construct 2D representations of many objects in the scene and only 3D representations of an open target duct if it is determined that the open target duct is present in the scene.

In some embodiments a plurality of 2D representations of the object or a part thereof, for example a plurality of images of the object or a part thereof, are combined to construct a 3D representation. The plurality of 2D representations may be obtained by capturing, at different time instances, the object or a part thereof, from different viewpoints, with a single camera.

The representation of the object is matched with various predetermined representations of open target ducts. This matching may be done by various statistical or machine learning methods. In case the representation of the object matches a predetermined representation of an open target duct with a probability higher than a predetermined threshold, an open target duct has been identified in the scene. The predetermined threshold may be obtained experimentally and may involve training a statistical model with representations of open target ducts, as is typical for various machine learning methods.

Once it is determined that the open target duct is present in the scene, the images captured by the imaging system may be used to determine the position of an open target duct with respect to the coupling device or the imaging system. In order to position the coupling device in front of the open target duct the position and orientation of the imaging system with respect to the coupling device may be determined. An efficient way to determine the relative position and orientation of the imaging system with respect to the coupling device is to have the imaging system on a predetermined and fixed position and orientation relative to the coupling device.

Herein, a position is a spatial position, that is, a position in space. However, other means to determine the relative position and orientation of the imaging system with respect to the coupling device are possible, that may include the use of GPS systems or compasses.

The relative position of the open target duct with respect to the coupling device may be obtained by constructing a disparity map comprising the open target duct, wherein the obtained disparity map may further be filtered to obtain the relative coordinates of the open target duct with respect to the imaging system or coupling device.

Although determining whether an open target duct is present in the scene may be possible using 2D representations, in order to be able to determine characteristic properties of the open target duct that are required to be compatible with the coupling device in order the properly connect the coupling device with the open target duct, a 3D representation of the open target duct is beneficial. The use of 3D representations reduces lighting issues and may be used to determine the thickness of an open target duct that may comprises a flange. Typically, during movement of the ship comprising the open target duct, or due to movement of the imaging system, more images of the open target duct may be acquired that may have a higher resolution and/or better quality and/or different orientations. Constructing the 3D representation may have been done to determine the presence of an open target duct in the scene, and the 3D representation may further be improved. Alternatively a new 3D representation of the open target duct is constructed that may be further improved when new image data comprising information on the open target duct are obtained.

Before connecting the coupling device to the target duct, the method may provide for a number of checks to be performed. It is determined whether the coupling device has suitable properties, i.e. the coupling device is compatible with the target duct, such that it can be connected to the target duct to provide a reliable coupling. For example, the shape and the size of the coupling device should match those of the target duct to which it is to be connected. The method, step f, may refer to predetermined 3D representations of open target ducts showing predetermined characteristic properties, such as acceptable and/or unacceptable shapes and sizes of open target ducts. In case the open target duct comprises a flange typical shapes and sizes are often predetermined according to AMSE or DIN standards, such as AMSE B16.5 or DIN EN 1092-1, that may be used to obtain or generate suitable predetermined 3D representations.

If the determination in method step g indicates that the coupling device is incompatible with the open target duct, an operator may be informed to take a necessary action, such as mounting an adapter, exchanging the coupling device or a part thereof, etc. However, if it is indicated that the coupling device is compatible with the open target duct, the coupling of the coupling device to the open target duct may be initiated, that may involve moving the coupling device towards the open target duct.

In an embodiment of the method, the characteristic property of the open target duct comprises information on a diameter of the open target duct.

Various properties of an open target duct may be useful to determine whether the coupling device is compatible with the open target duct. An important property of the open target duct is its diameter, since the diameter of the open target duct needs to be substantially equal to the diameter of the opening of the coupling device. Here, the diameter may refer to the inner or outer diameter of the open target duct. Alternatively the property comprises a plurality of diameters, such as both the inner and outer diameter of the target duct.

In an embodiment of the method, the open target duct comprises a flange.

Often the open target duct comprises a flange. Additionally a sealing ring or sealing face may be present.

In an embodiment of the method, the characteristic property of the open target duct comprises information on a plurality of holes in the flange.

In case the open target duct comprises a flange, the number, diameter and position of the holes in the flange may indicate the compatibility of the open target duct to the coupling device that should connect to the open target duct. Generally, the shape of the open target duct should be compatible with the coupling device in order to permit a reliable coupling. Properties of flanges are often predetermined according to AMSE or DIN standards, such as AMSE B16.5 or DIN EN 1092-1.

In an embodiment of the method, the method further comprises:
    determining, after step c and before step d, based on matching the representation of the object in the scene with a plurality of predetermined representations comprising representations of closed target ducts, whether the object represents a closed target duct being present in the scene.

Besides or instead of open target ducts there may also be closed target ducts present in the scene, i.e. a target duct covered by a cover or otherwise shut off. In case of a closed target duct, no connection or fluid transfer is possible. In particular, if it is determined that there is no open target duct present in the scene, but that there is a closed target duct present in the scene, an operator may be informed that connecting the coupling device to a target duct cannot be performed and that a closed target duct should be opened, such as by removing the cover.

In an embodiment of the method, the method further comprises:
    indicating whether the characteristic property of the open target duct is determined; and/or
    indicating whether the coupling device is compatible with the open target duct.

Providing information whether the property of the open target duct is determined is helpful for the receiver of this information to determine if the captured images provide sufficient information on the open target duct to identify its characteristic properties. In particular, if it is indicated that the property of the open target duct is not, or not well determined, it may be needed to move the imaging system further, e.g. to capture an additional image, or an additional plurality of images. Indicating whether the coupling device is compatible with the open target duct is helpful to decide whether the coupling process should be continued or aborted. In particular, if it is indicated that the coupling device is not compatible with the open target duct, the coupling device may be exchanged with, or adapted to, one that is compatible with the open target duct. In this case, the property of the open target duct may be useful to determine which coupling device would be compatible with the determined property of the open target duct. For example, in another embodiment of the method, the method further comprises suggesting a suitable coupling device that is compatible with the open target duct. Indicating whether the property of the open target duct is determined or whether the coupling device is compatible with the open target duct may be achieved by providing suitable feedback via an interface, such as a display, to a human operator. Alternatively, the indication may be achieved by sending a signal comprising the relevant information to a computer or control system, which may be the same computer or control system as the one determining whether the property of the open target duct is determined or whether the coupling device is compatible with the open target duct.

In an embodiment of the method, the method further comprises:
    repeating steps b to e for every object in the scene;
    indicating a number of open target ducts that are present in the scene; and
    selecting, if the number of open target ducts is greater than one, the open target duct to which the coupling device should connect.

It may happen that in the scene more than one open target duct is present. In this case it is useful to identify all open target ducts present in the scene, to indicate the number of open target ducts that are present, and to select the open target duct the coupling device should connect. In particular, selecting the open target duct to which the coupling device should connect may be performed by a user of the marine loading method, e.g. an operator, after having been informed about the number of open target ducts.

In an embodiment of the method, the method further comprises:
receiving, after step h, detailed image data associated to least one detailed image of the open target duct; and
determining whether the open target duct has defects, based on the detailed image data and on matching the detailed image data with image defect data associated to a plurality of predetermined images of open target ducts with defects and a plurality of predetermined images of open target ducts without defects.

Initially, the camera may be too far away from the open target duct to capture images of the open target duct that are sufficiently detailed such that defects that are possibly present can be noted. Therefore, after moving the imaging system closer to the target duct it may be beneficial to capture a higher detailed image. In particular, the surface of the open target duct might comprise holes, wrinkles, edge cracks, inclusions, contaminants, debris, coating voids, scratches, spots, or dents, that may cause leakage once the coupling device is connected to the open target duct and fluid is transferred through the coupling device. In particular defects in or on the seal face of an open target duct or a flange is problematic, as that may prohibit a sealed connection between the coupling device and the flange of the open target duct. Here, generally a 2D representation of the open target duct is sufficient, as the defects are generally too small to be adequately determined in three dimensions. In case the surface of the open target is reflective, deflectometry or other filtering techniques may be useful before matching the detailed image with a plurality of predetermined images of open target ducts with defects and open target ducts without defects. This matching may be done by various statistical or machine learning methods. In case the detailed image or part thereof, matches a predetermined representation of an open target duct with defects with a probability higher than a first predetermined threshold, an open target duct with defect has been identified. Similarly, in case the detailed image or part thereof, matches a predetermined representation of an open target duct without defects with a probability higher than a second predetermined threshold, an open target duct without defect has been identified. The first predetermined threshold and the second predetermined threshold may be obtained experimentally and may involve training a statistical model with predetermined images of open target ducts without defects and predetermined images of open target ducts with defects.

In an embodiment of the method, the method further comprises:
moving the coupling device at a first height towards the open target duct and then transitioning the coupling device to a second height, wherein the first height is higher than the second height, and wherein the second height is substantially the same height as the height of the open target duct.

In front of an open target duct there may be some obstacles present, such as a railing or a fence. Such objects may be recognized during the process of identifying target ducts in the scene as objects that are not target ducts and therefore as obstacles. Anyway, it is advantageous to have a trajectory of the coupling device that is likely to avoid hitting obstacles even if the obstacle is not determined or recognized properly. To ensure that the coupling device is not hitting the obstacle when connecting to the open target duct, the aforementioned movement is along an efficient trajectory before connecting to the open target duct.

In an embodiment of the method, the method further comprises:
moving, if it is determined that the open target duct is present in the scene, the imaging system along a trajectory such that the open target duct remains present in the scene.

An important aspect of the invention is to determine the presence of an open target duct in the scene. Since the open target duct may move due to the movement of a ship on which the open target duct is mounted, it may happen that after it is determined that the open target duct is present in the scene, the open target duct disappears from the scene, if the imaging system is not moving. To maintain the presence of the open target duct in the scene it may be needed that the imaging system or part thereof is moving. In particular, the position and/or orientation of a camera may need to be altered.

In an embodiment of the method, the method further comprises:
moving, if the estimated position of the open target duct has been determined, the imaging system along a trajectory such that the orientation of the open target duct with respect to the imaging system changes;
capturing additional images of the scene, while the imaging system moves;
improving, based on the additional images of the scene captured, a representation accuracy of the representation or the 3D representation of the open target duct.

In case the 3D representation of the open target duct is not sufficiently accurate to determine characteristic properties, it is helpful to capture additional images of the open target duct. In particular, it may be beneficial when images are captured where the open target duct is seen from different angles or with a different orientations.

In an embodiment of the method, the method further comprises:
improving, based on the 3D representation of the open target duct with the improved representation accuracy, a position accuracy of the estimated position of the open target duct with respect to the coupling device or the imaging system.

The estimated position of the open target duct is essential to bring the coupling device towards the open target duct. If the 3D representation of the open target duct is improved, the improved representational accuracy may be helpful to also improve the position accuracy of the estimated position. In particular, the improved representational accuracy may permit to better identify the shape of the open target duct such that for example its centre may be determined with a higher accuracy making a more accurate positioning of the coupling device possible.

In an embodiment of the method, the method further comprises:
moving the imaging system together with the coupling device, wherein the relative position of the imaging system with respect to the coupling device remains substantially the same.

When the imaging system is connected to the coupling device at a fixed position with respect to the coupling device, it may be sufficient to only provide actuators for moving the marine loading arm and the coupling device, in order to move the imaging system as well. It may be efficient to mount the imaging system on the marine loading arm such that the distance between the imaging system and the coupling device may be known and constant. Furthermore, mounting the imaging system on the marine loading arm may make it easier to move the imaging system towards the open target duct in order to capture more and more detailed images.

In a second aspect of the invention, a marine loading system is provided, wherein the marine loading system comprises:
- a marine loading arm comprising:
  - at least one fluid transfer line provided with a coupling device;
  - at least one actuator being adapted to move the marine loading arm and to position the coupling device;
- an imaging system configured to capture a plurality of images, wherein the position and orientation of the imaging system with respect to the coupling device is determinable; and
- a control system operatively connected to the at least one actuator and to the imaging system, wherein the control system is configured to:
  a. receive, from the imaging system, image data associated to the plurality of images of a scene;
  b. construct, based on the image data, a representation of an object in the scene;
  c. determine, based on matching the representation of the object in the scene with a plurality of predetermined representations comprising representations of open target ducts, whether the object represents an open target duct being present in the scene;
  d. determine, if the open target duct is present in the scene, based on the representation of the open target duct, an estimated position of the open target duct with respect to the coupling device or the imaging system;
  e. construct, based on the image data, a 3D representation of the open target duct;
  f. determine a characteristic property of the open target duct, based on matching the 3D representation of the open target duct with a plurality of predetermined 3D representations comprising 3D representations of open target ducts with predetermined characteristic properties;
  g. determine, based on the determined characteristic property of the open target duct, whether the coupling device is compatible with the open target duct, wherein a coupling device is compatible with the open target duct if the coupling device can be connected to the open target duct; and
  h. control, if the coupling device is compatible with the open target duct, the at least one actuator to move the coupling device towards the open target duct, based on the estimated position of the open target duct with respect to the coupling device or the imaging system.

The marine loading system is configured to carry out the method for marine loading according to the first aspect of the invention. In particular, the control system is provided to perform a plurality of steps of the method for marine loading. The control system may include one or more processors, image processing devices, non-transient computer readable media or other components that may be needed to carry out the method for marine loading according to the first aspect of the invention.

In an embodiment of the marine loading system, the marine loading system may comprise means to move the imaging system. An effective means is to mount the imaging system on the marine loading arm, such that the imaging system can be moved by controlling the same actuators as are used to move the loading arm or coupling device. Alternatively, the imaging system may, for example, be at least partly mounted on a drone which can move towards the open target duct or may be at least partly mounted on a separate movable arm that can move independently from the marine loading arm.

In an embodiment the imaging system may comprise a stereo camera, since a images captured by a stereo camera are in particular suitable to construct 3D representations of objects, since they capture at a single instance an object from two different angles. Generally, based on these images a disparity map of these images is calculated. Based on this disparity map it may be possible to determine the 3D representation of an object, including objects such as open and closed target ducts.

In a third aspect of the invention, a non-transient computer readable medium is provided, wherein the non-transient computer readable medium contains program instructions for a control system of the marine loading system according to the second aspect of the invention, to cause the control system to perform steps a to h.

In a fourth aspect of the invention, a computer program is provided comprising computer instructions which, when loaded in a control system of the marine loading system according to the second aspect of the invention, to cause the control system to perform steps a to h.

These and other aspects of the invention will be more readily appreciated as the same becomes better understood by reference to the following detailed description and considered in connection with the accompanying drawings in which like reference symbols designate like parts.

DETAILED DESCRIPTION OF EMBODIMENTS

Figure 1:
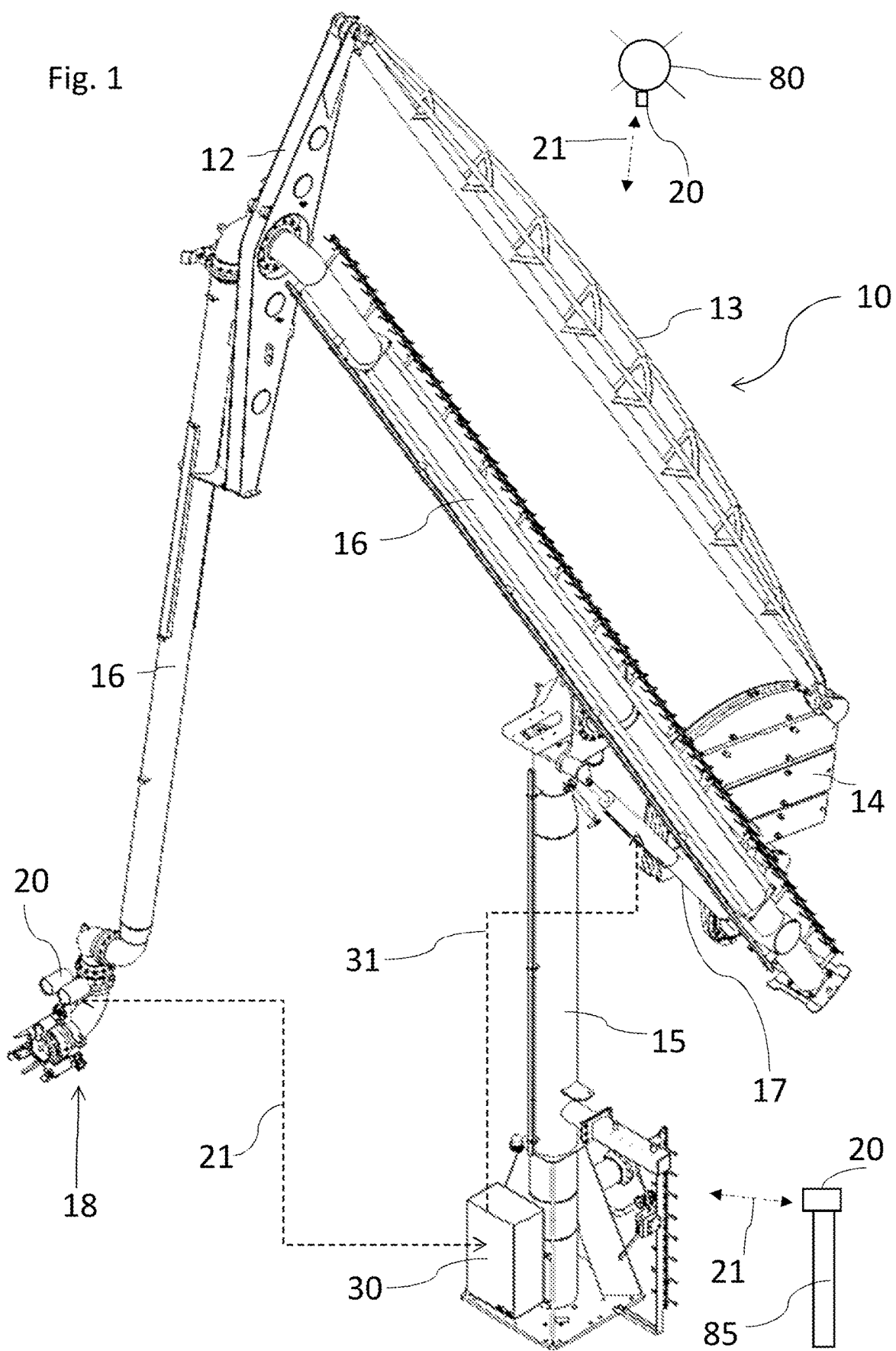
FIG. 1 depicts a perspective view, partially schematic, of an embodiment of a machine loading system.

FIG. 1 depicts an embodiment of a machine loading system 10 according to the invention. The machine loading system 10 comprises an apex 12, a balancer link 13 and a counterweight 14. The marine loading system 10 further comprises a fluid transfer line 16 which is connected to a coupling device 18 and along which a fluid such as a liquid or a gas enters or leaves the marine loading system. Actuators 17 are present to move and position the marine loading arm and its coupling device 18. An imaging system 20 is configured to capture a plurality of images of a scene and to send image data via a wired or wireless communication link transmitting a imaging signal 21, schematically indicated by a dashed line, to a control system 30. The imaging system 20 is mounted on the marine loading arm, close to the coupling device 18. Consequently, the imaging system 20 moves together with the coupling device 18, wherein the relative position of the imaging system 20 with respect to the coupling device 18 remains substantially the same. Alternatively or additionally, the imaging system 20 is (partly) mounted on a drone 80 and/or a (moveable) arm 85. The control system 30 is configured to perform a plurality of steps based on the received image data. In particular, the control system 30 is configured to process the image data and to generate an actuation signal 31, transmitted by a communication link as schematically indicated by a dashed line, to control the actuator 17 such that the marine loading arm and the coupling device 18 are moved and positioned properly.

Figure 2:
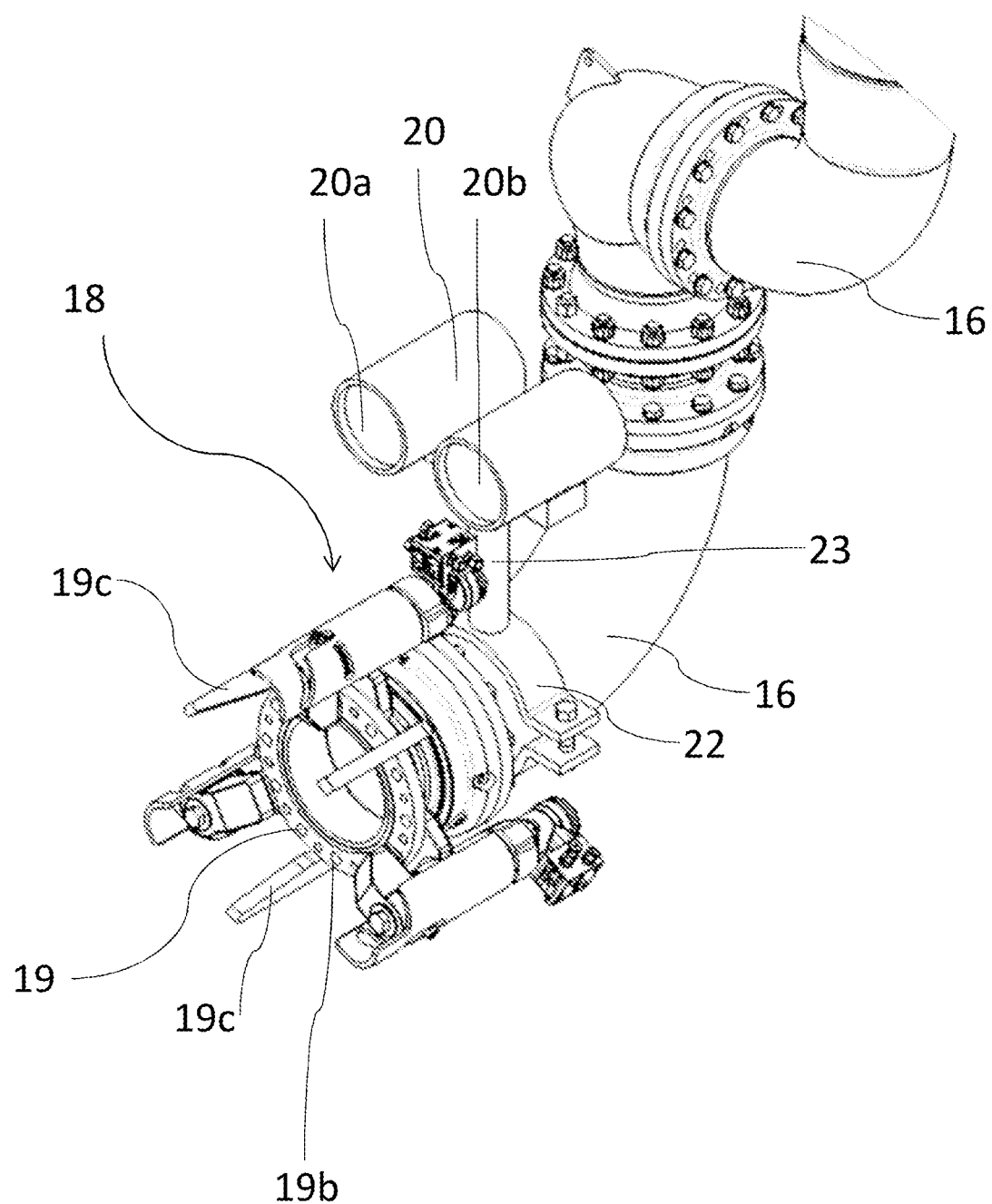
FIG. 2 depicts a perspective view of an embodiment of a coupling device and a imaging system of the machine loading system in greater detail.

FIG. 2 depicts in greater detail the coupling device 18 of the marine loading system. In particular, FIG. 2 shows that the coupling device 18 comprises a flange 19 comprising a plurality of holes 19b. The imaging system 20 comprises a stereo camera comprising two lenses 20a, 20b. The imaging system 20 is mounted on the marine loading arm, close to the coupling device 18. The stereo camera is fastened to the fluid transfer line 16 via a camera pole 23 that is connected to a pole clamp 22. A plurality of clamps 19c are arranged to clamp an open target duct 40 comprising a flange 41, when the coupling device 18 is connecting to it. To permit proper clamping of the open target duct 40 comprising a flange 41, the clamps 19c have to be arranged at a proper distance. It is therefore important to determine whether the open target duct 40 is compatible with the coupling device 18 comprising the clamps 19c. The coupling device 18 is articulated at its end with three degrees of rotational freedom.

Figure 13:
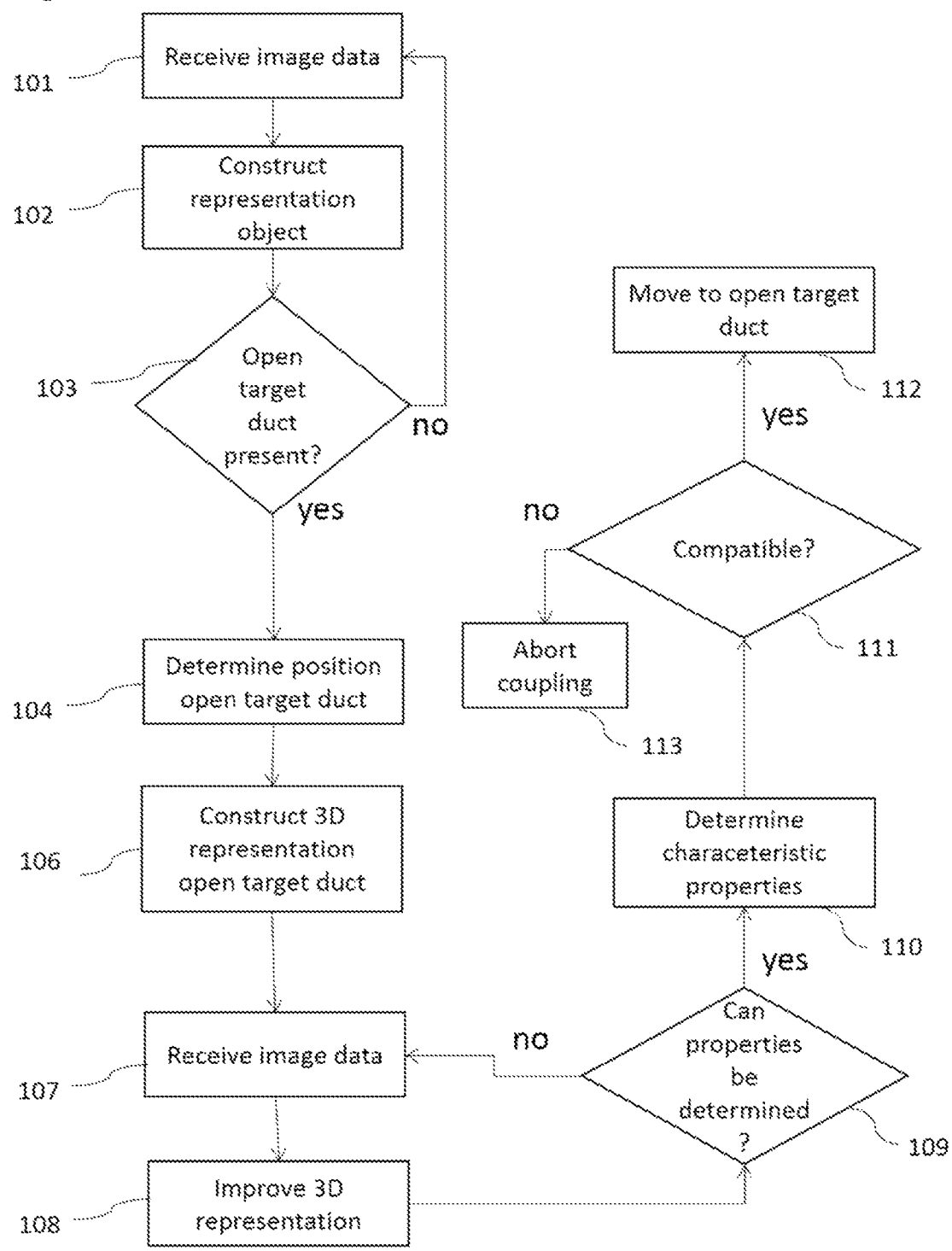
FIG. 13 depicts a first flow diagram of steps associated with the invention.

FIG. 13 depicts a first flow diagram of steps associated with the invention.

In particular, FIG. 13 depicts steps of a marine loading method for a marine loading system 10, wherein the arrows indicate an efficient order to perform the plurality of steps.

Figure 3:
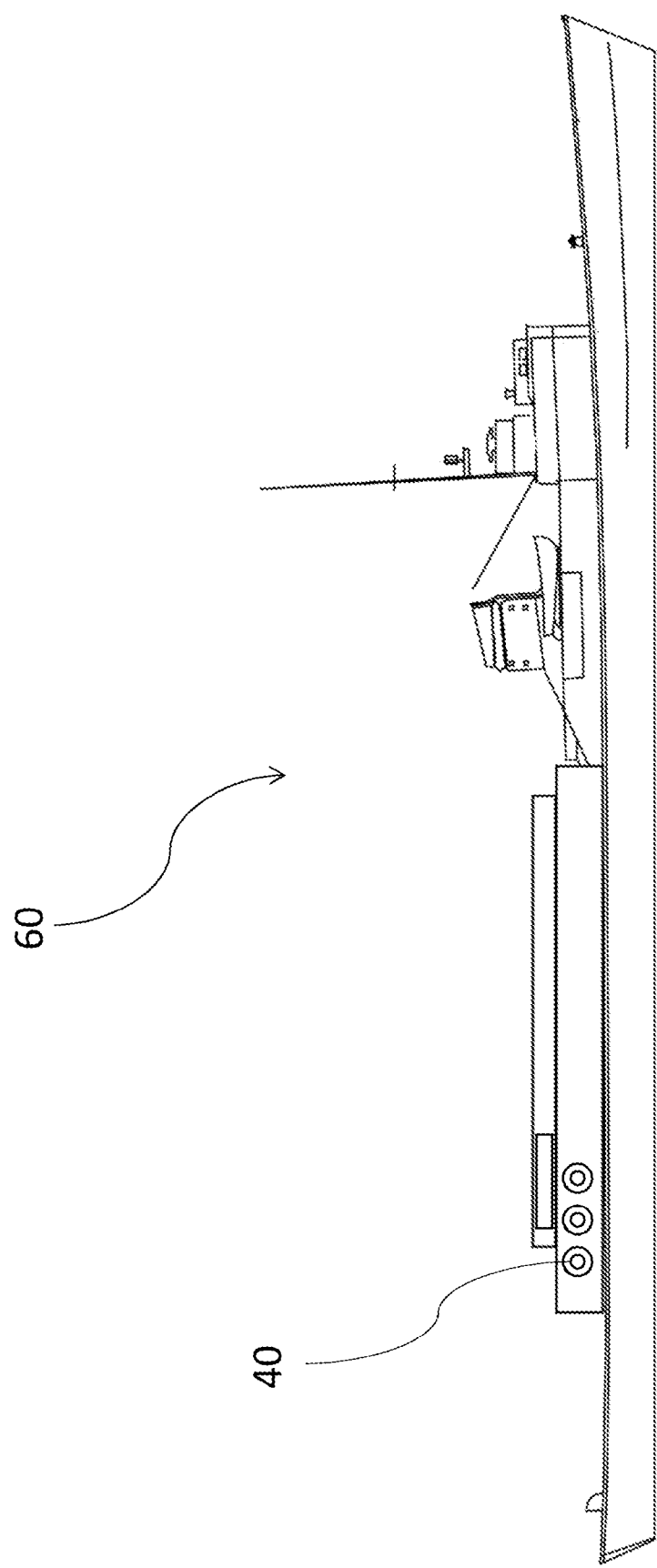
FIG. 3 depicts a side view of a ship comprising target ducts.

In step 101, the control system 30 receives image data from imaging system 20 via an imaging signal 21 associated to the plurality of images of a scene. As shown in FIG. 3, the scene may comprise a ship 60 on which at least one open target duct 40 with flange is mounted.

Figure 4:
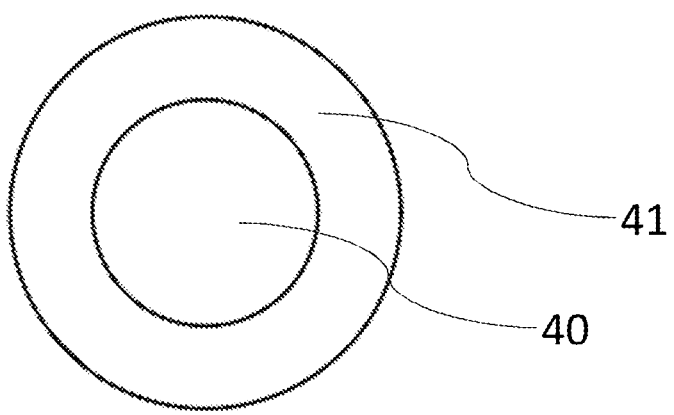
FIG. 4 depicts a 2D front view of an open target duct.
Figure 5:
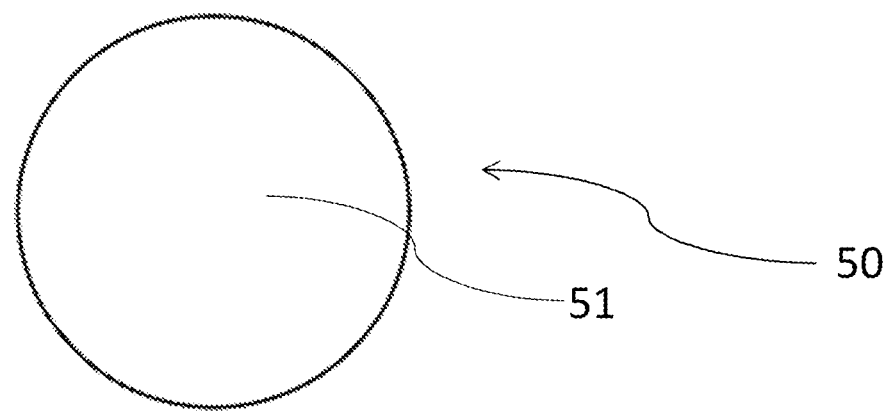
FIG. 5 depicts a 2D front view of a closed target duct.
Figure 6:
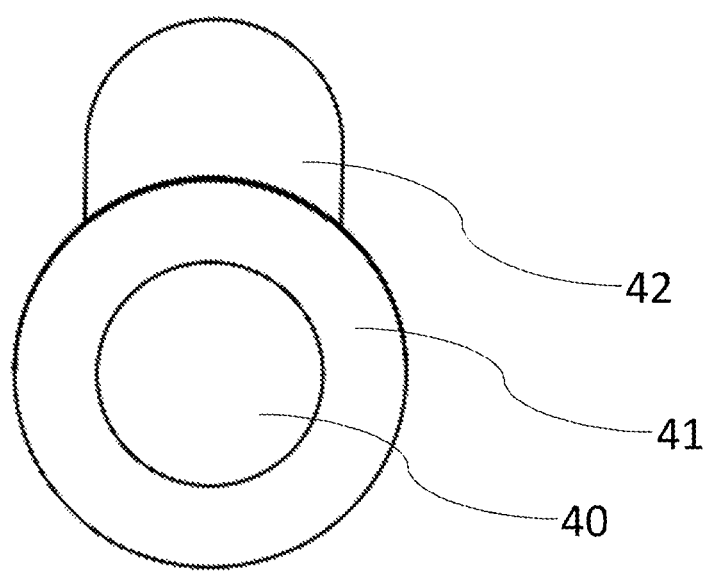
FIG. 6 depicts a 3D perspective view of an open target duct.
Figure 7:
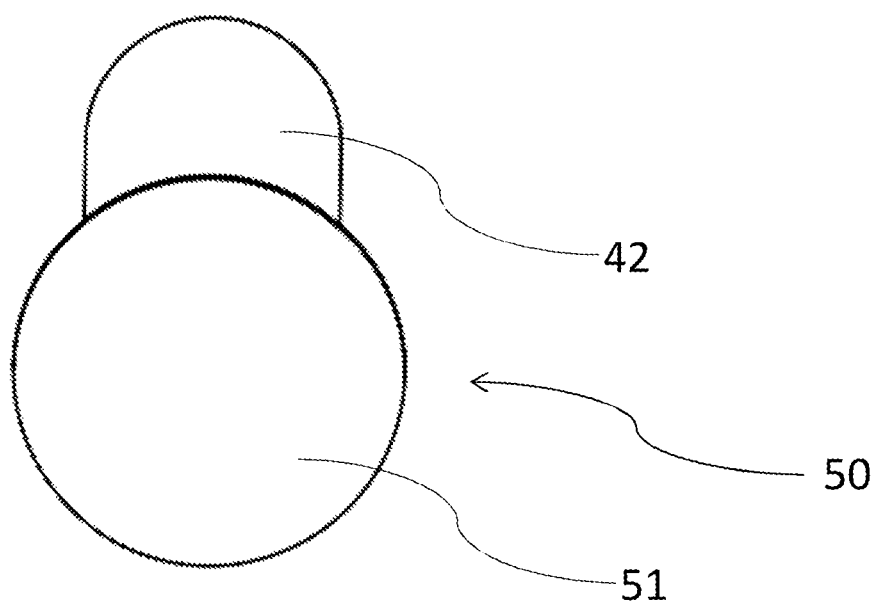
FIG. 7 depicts a 3D perspective view of a closed target duct.

In step 102, the control system 30 constructs, based on the image data, a representation of an object in the scene. The representation may be a 2D or a 3D representation. An example of a non-detailed 2D representation of an open target duct is provided in FIG. 4. In particular, FIG. 4 depicts an open target duct 40, whereas FIG. 5 depicts a closed target duct, showing a cover 51. The inner circle and outer circle in FIG. 4 are related to an inner and an outer diameter of a flange 41, respectively. In case more images from various orientations are captured and/or the target duct is closer to the imaging system, a related 3D representation may be constructed. FIG. 6 depicts a 3D representation of an open target duct 40 connected to a fluid transfer line 42, whereas FIG. 7 depicts a 3D representation of a closed target duct.

In step 103, the control system 30 determines, based on matching the representation of the object in the scene with a plurality of predetermined representations comprising representations of open target ducts, whether or not an open target duct 40 is present in the scene. In case it is determined that the open target duct 40 is present in the scene, it is efficient to move the imaging system 20 along a trajectory such that the open target duct 40 remains present in the scene.

If, in step 103, the control system 30 has determined that an open target duct 40 is present in the scene, the flow continues with step 104.

If, in step 103, the control system 30 has determined that there is no open target duct 40 present in the scene, the flow returns to step 101.

In step 104, the control system 30 determines, if the open target duct 40 is present in the scene, an estimated position of the open target duct 40 with respect to the coupling device 18 or the imaging system 20. Determining the position may be based on the (3D) representation of the open target duct 40.

In step 106, the control system 30 constructs, based on the image data, a 3D representation of the open target duct 40.

In step 107, the control system 30 receives, via the imaging signal 21, additional images of the scene captured by the imaging system 20. During this step, the control system 30 may control the at least one actuator 17 to move the coupling device 18 towards the open target duct 40 to enable the imaging system 20 to capture more and better images of the open target duct 40. In particular it may be beneficial when the imaging system 20 moves along a trajectory such that the orientation of the open target duct 40 with respect to the imaging system 20 changes, such that the imaging system 20 may view the open target duct 40 from different angles and/or orientations.

Figure 8:
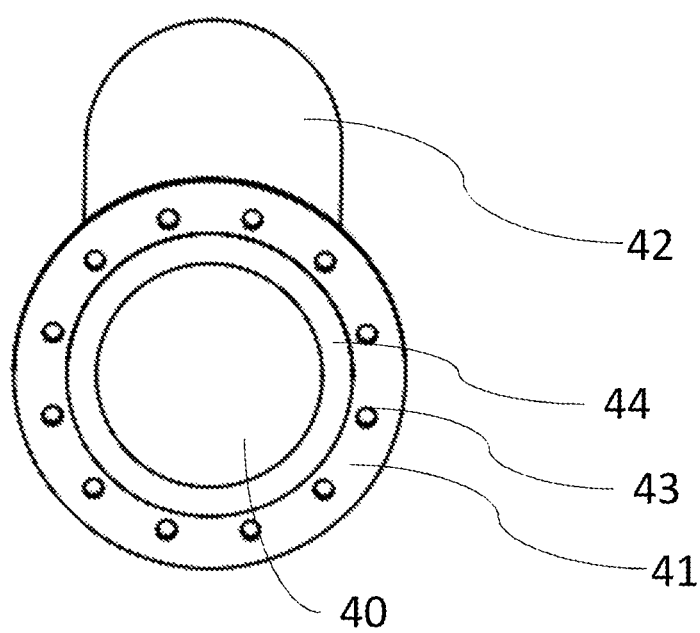
FIG. 8 depicts a first detailed 3D perspective view of an open target duct.
Figure 9:
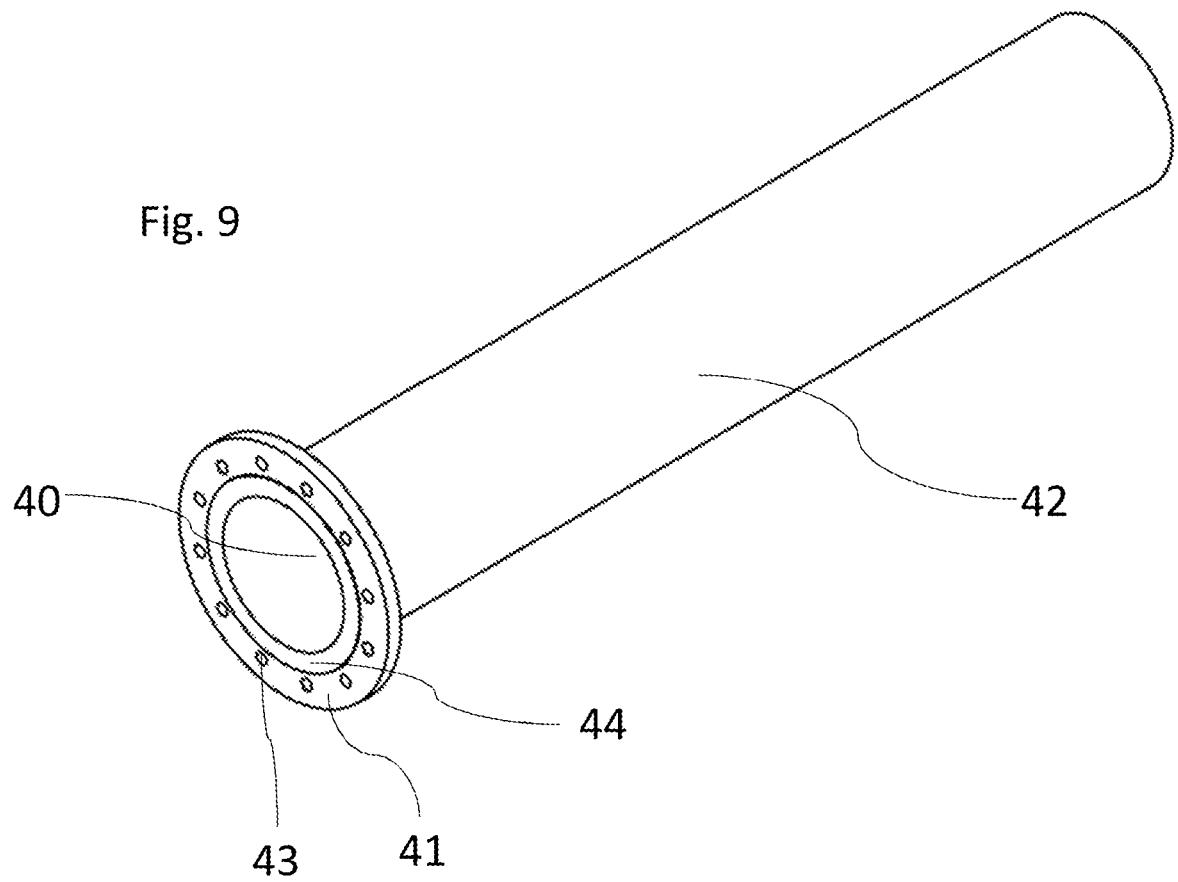
FIG. 9 depicts a second detailed 3D perspective view of an open target duct.
Figure 10:
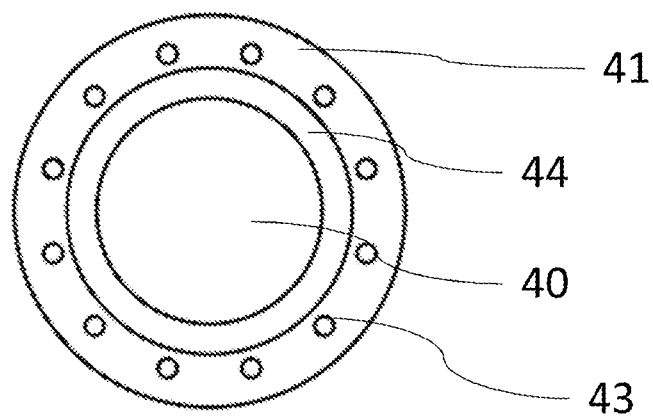
FIG. 10 depicts a detailed 2D front view of an open target duct without defect.

In step 108, the control system 30 improves, based on the additional images of the scene captured, an representation accuracy of the 3D representation of the open target duct 40. Although it may be clear according to FIGS. 4 and 6 whether the target duct is open or closed, the images may not be detailed enough to determine whether the coupling device 18 is compatible with the (open) target duct 40. Improving the representation accuracy of the 3D representation may continue until the 3D representation of the open target duct 40 can be matched with predetermined 3D representations of open target ducts. FIGS. 8 and 9 depict, from different viewpoints, a detailed 3D representation of the open target duct that may be used to determine characterizing properties such as its shape, inner diameter, outer diameter, diameter of holes 43 and the plurality of the holes 43.

In step 109, the control system 30 tries to determine a characteristic property of the open target duct 40, based on matching the 3D representation with the improved representation accuracy of the open target duct 40 with a plurality of predetermined 3D representations comprising 3D representations of open target ducts with predetermined characteristic properties.

If, in step 109, the control system 30 is unable to determine a characteristic property of the open target duct 40, the flow returns to step 107.

If, in step 109, the control system 30 is able to determine a characteristic property of the open target duct 40, the flow continues with step 110.

In step 110, the control system 30 determines whether a characteristic property of the open target duct 40 can be determined, based on matching the 3D representation of the open target duct 40 with a plurality of predetermined 3D representations comprising 3D representations of open target ducts with predetermined characteristic properties.

In step 111, the control system 30 determines, based on the determined characteristic property of the open target duct 40, whether or not the coupling device 18 is compatible with the open target duct 40, wherein a coupling device 18 is compatible with the open target duct 40 if the coupling device 18 can be reliably connected to the open target duct 40.

If, in step 111, the control system 30 has determined that the coupling device 18 is compatible with the open target duct 40, the flow continues with step 112.

If, in step 111, the control system 30 has determined that the coupling device 18 is not compatible with the open target duct 40, the flow continues with step 113.

Figure 12:
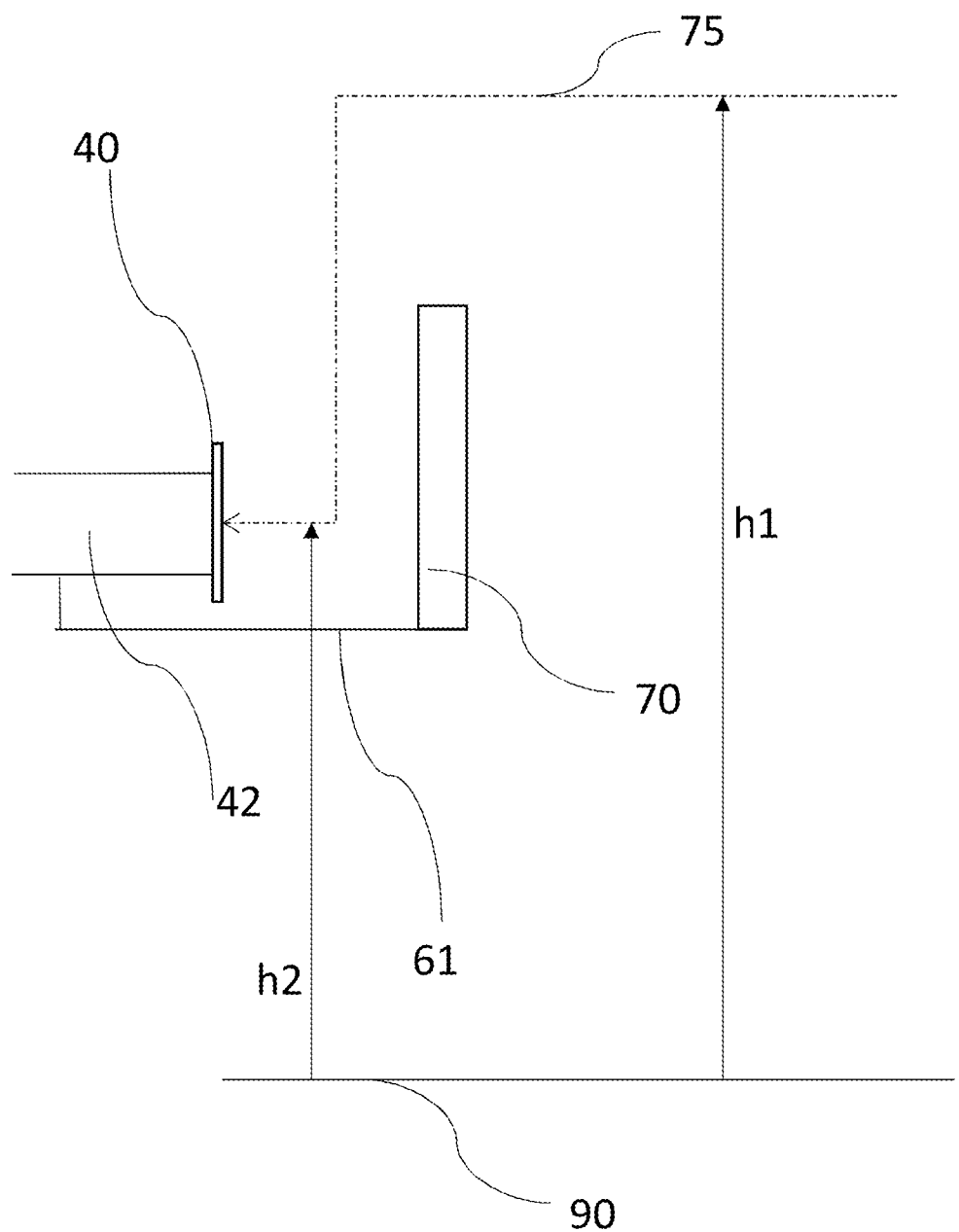
FIG. 12 illustrates a preferred trajectory of the coupling device.

In step 112, the control system 30 controls, if the coupling device 18 is compatible with the open target duct, the at least one actuator 17 via the actuation signal 31 to move the coupling device 18 towards the open target duct 40. A preferred trajectory 75 of the coupling device 18 towards the open target duct 40 is depicted in FIG. 12, wherein the coupling device avoids an obstacle 70 that may be mounted on the ship 60, in particular mounted on a deck 61 of the ship. In particular, the coupling device 18 moves at a first height h1 towards the open target duct 40 and then transitions the coupling device 18 to a second height h2, wherein the first height h1 is higher than the second height h2, and wherein the second height h2 is substantially the same height as the height of the centre of the open target duct 40. The first height h1 and the second height h2 are heights with respect to a (virtual) horizontal plane 90, that may has an identical height as the height of a water surface, a pier or a shore.

In step 113, the control system 30 aborts the coupling process if in step 111 it is determined that open target duct 40 is not compatible with the coupling device 18.

Figure 14:
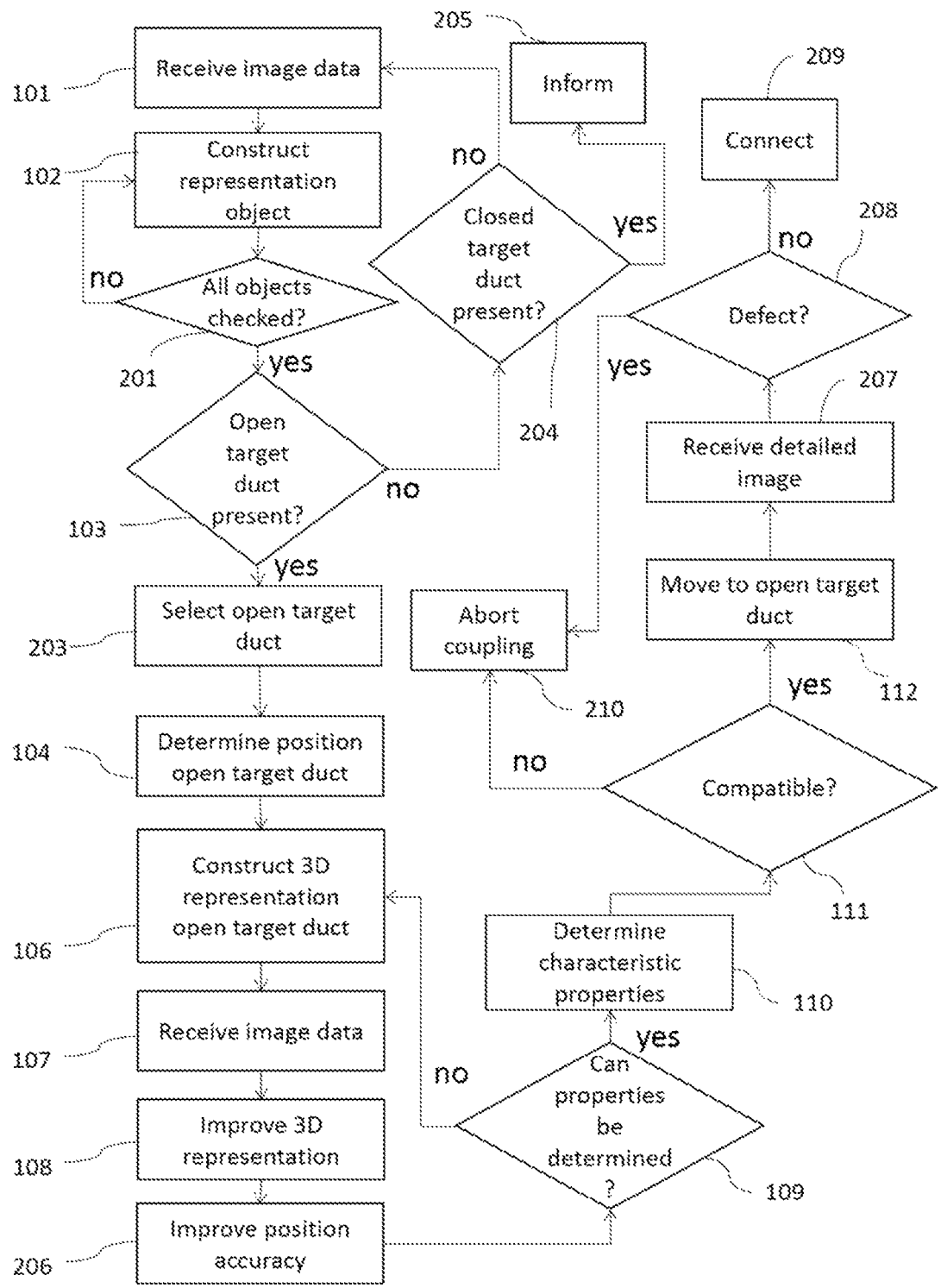
FIG. 14 depicts a second flow diagram of steps associated with the invention.

FIG. 14 depicts a second flow diagram of steps associated to the invention.

In particular, FIG. 14 depicts steps of a marine loading method for a marine loading system 10, wherein the arrows indicate an efficient order to perform the plurality of steps. Some steps of the second flow diagram are similar to steps of the first flow diagram depicted in FIG. 13, but the flow diagram of FIG. 14 comprises a few modifications and additional steps as described in the following.

In step 201, after the control system 30, in step 102, has constructed a representation of an object in the scene, the control system 30 checks whether or not for all objects in the scene a representation is constructed. This check is performed in case there may be multiple target ducts present in the scene. It may be preferable to first determine whether a ship 60 is present in the scene and thereafter whether target ducts are present on the ship 60.

If, in step 201, the control system 30 has determined that not for all objects in the scene a representation is constructed, the flow returns to step 102 to construct a representation of another object.

If, in step 201, the control system 30 has determined that for all objects in the scene a representation is constructed, the flow continues with step 103.

In step 203, after the control system 30, in step 103, has determined that at least one open target duct 40 is present in the scene, the open target duct 40 is selected to which the coupling device 18 should connect. In case only one open target duct 40 is present in the scene, this one open target duct 40 is selected. In case multiple open target ducts 40 are present in the scene, it may be preferable to communicate the number and approximate locations of the open target ducts 40 to an operator who then decides to which open target duct 40 the coupling device 18 should connect. Alternatively, selecting the open target duct 40 may be performed by a computer, without human intervention.

In step 204, after the control system 30, in step 103, has determined that no open target duct 40 is present in the scene, the control system 30 determines, based on matching the objects in the scene with a plurality of predetermined 3D representations comprising 3D representations of closed target ducts, whether or not a closed target duct 50 is present in the scene. In case a closed target duct 50 is present in the scene and/or in the case a closed target duct 50 is not present in the scene, it is preferable to continue receiving image data to continue looking for open target ducts 40.

If, in step 204, the control system 30 has determined that no closed target duct 50 is present in the scene, the flow returns to step 101.

If, in step 204, the control system 30 has determined that a closed target duct 50 is present in the scene, the flow continues with step 205. Additionally, the flow may return to step 101 as well.

In step 205, the control system 30 informs an operator or computer that a closed target duct 50 is present in the scene, that may use this information to initiate the opening of the closed target duct 50, which may be done by removing a cover 51.

In step 206, after the control system 30, in step 108, improved the representational accuracy, the control system 30 improves, based on the 3D representation of the open target duct 40 with the improved representational accuracy, a position accuracy of the estimated position of the open target duct 40 with respect to the coupling device 18. This increased accuracy of the position is beneficial to move the coupling device 18 more precise towards the open target duct 40.

Figure 11:
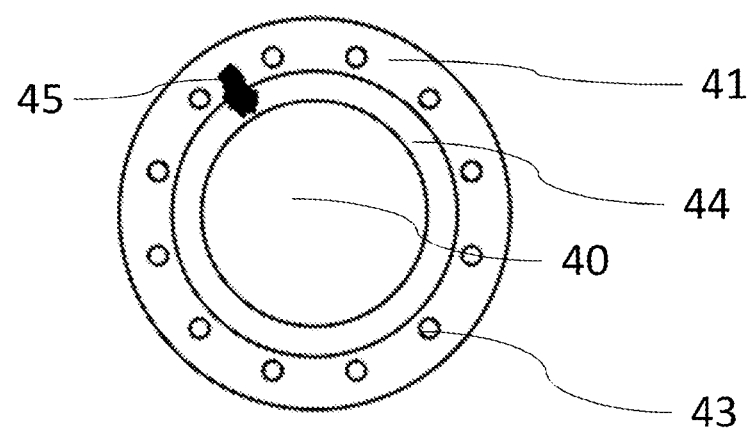
FIG. 11 depicts a detailed 2D front view of an open target duct with defect.

In step 207, after the coupling device 18, in step 112, has moved towards the open target duct 40, the control system 30 receives, via the imaging signal 21, detailed image data associated to least one detailed image of the open target duct 40. Since this image is taken when the coupling device 18 has moved relatively close to the open target duct 40, an image of the open target duct 40 can be obtained that comprises relatively fine details, such that even small defects 43 may be visible on the detailed image (see FIG. 11).

In step 208, the control system 30 determines whether or not the open target duct 40 has a defect 45, based on the detailed image data and on matching the detailed image data with image defect data associated to a plurality of predetermined images of open target ducts with defects and a plurality of predetermined images of open target ducts without defects. In particular defects on the seal face 44 are important to detect.

If, in step 208, the control system 30 has determined that the open target duct 40 has no defect, the flow continues with step 209.

If, in step 208, the control system 30 has determined that the open target duct 40 has a defect 45, the flow continues with step 210.

In step 209, the coupling device connects to the open target duct 40 after it is determined that the open target duct 40 is compatible with the coupling device 18 and that the open target duct 40 has no defects.

In step 210, the control system 30 aborts the coupling process because the open target duct 40 is not compatible with the coupling device 18 or because the open target duct 40 has a defect 45.

To illustrate that a characteristic property may not be determinable, holes that may be present in the flange 41 are not depicted in FIG. 4 and FIG. 6. Also, bolts that may be present in the cover 51 are not depicted in FIG. 5 and FIG. 7.

As explained above, a method for marine loading is disclosed, the method comprising: providing a marine loading system comprising: a marine loading arm, at least one fluid transfer line provided with a coupling device, at least one actuator being adapted to move the marine loading arm and to position the coupling device and a imaging system configured to capture a plurality of images. The method further comprises:
  receiving image data associated with the plurality of images of a scene;
  constructing, based on the image data, a representation of an object in the scene;
  determining whether the object represents an open target duct being present in the scene;
  determining an estimated position of the open target duct with respect to the coupling device or the imaging system;
  constructing a 3D representation of the open target duct;
  determining a characteristic property of the open target duct, based on matching the 3D representation of the open target duct with a plurality of predetermined 3D representations comprising 3D representations of open target ducts with predetermined characteristic properties;
  determining whether the coupling device is compatible with the open target duct; and
  moving the coupling device towards the open target duct.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting, but rather, to provide an understandable description of the invention.

The terms "a"/"an", as used herein, are defined as one or more than one. The term plurality, as used herein, is defined as two or more than two. The term another, as used herein, is defined as at least a second or more. The terms including and/or having, as used herein, are defined as comprising (i.e., open language, not excluding other elements or steps). Any reference signs in the claims should not be construed as limiting the scope of the claims or the invention.

The mere fact that certain measures are recited in mutually different dependent claims does not indicate that a combination of these measures cannot be used to advantage.

The term coupled, as used herein, is defined as connected, although not necessarily directly, and not necessarily mechanically (e.g. magnetically).

A single processor or other unit, or multiple processors or other units may fulfil control the functions of several test routine steps recited in the claims.

LIST OF REFERENCE SIGNS 10 marine loading system
12 apex
13 balancer link
14 counterweight
15 base riser
16 fluid transfer line
17 actuator
18 coupling device
19 connection flange
19b hole
19c clamp
20 imaging system
20a lens
20b lens
21 imaging signal
22 pole clamp
23 camera pole
30 control system
31 actuation signal
40 open target duct
41 flange
42 fluid transfer line
43 hole
44 seal face
45 defect
50 closed target duct
51 cover
52 bolt
60 ship
61 deck
70 obstacle
75 preferred trajectory
80 drone
85 arm
h1 first height
h2 second height
90 horizontal plane

The invention claimed is:

1. A method for marine loading, the method comprising:
  providing a marine loading system comprising:
    a marine loading arm comprising:
      at least one fluid transfer line provided with a coupling device;
      at least one actuator being adapted to move the marine loading arm and to position the coupling device;
    an imaging system configured to capture a plurality of images, wherein the position and orientation of the imaging system with respect to the coupling device is determinable; and
  a) receiving, from the imaging system, image data associated with the plurality of images of a scene;
  b) constructing, based on the image data, a representation of an object in the scene;
  c) determining, based on matching the representation of the object in the scene with a plurality of predetermined representations comprising representations of open target ducts, whether the object represents an open target duct being present in the scene;

d) determining, if it is determined that the open target duct is present in the scene, an estimated position of the open target duct with respect to the coupling device;

e) constructing, based on the image data, a 3D representation of the open target duct;

f) determining a characteristic property of the open target duct, based on matching the 3D representation of the open target duct with a plurality of predetermined 3D representations comprising 3D representations of open target ducts with predetermined characteristic properties;

g) determining, based on the determined characteristic property of the open target duct, whether the coupling device is compatible with the open target duct, wherein a coupling device is compatible with the open target duct if the coupling device can be connected to the open target duct; and h) moving, if the coupling device is compatible with the open target duct, the coupling device towards the open target duct, based on the estimated position of the open target duct with respect to the coupling device.

2. The method according to claim 1, wherein the characteristic property of the open target duct comprises information on a diameter of the open target duct.

3. The method according to claim 1, further comprising: determining, after step c and before step d, based on matching the representation of the object in the scene with a plurality of predetermined representations comprising representations of closed target ducts, whether the object represents a closed target duct being present in the scene.

4. The method according claim 1, further comprising: indicating whether the property of the open target duct is determined; and/or
indicating whether the coupling device is compatible with the open target duct.

5. The method claim 1, further comprising:
repeating steps b to e for every object in the scene;
indicating a number of open target ducts that are present in the scene; and
selecting, if the number of open target ducts is greater than one, the open target duct to which the coupling device should connect.

6. The method according to claim 1, further comprising:
receiving, after step h, detailed image data associated to least one detailed image of the open target duct; and
determining whether the open target duct has defects, based on the detailed image data and on matching the detailed image data with image defect data associated to a plurality of predetermined images of open target ducts with defects and a plurality of predetermined images of open target ducts without defects.

7. The method according to claim 1, further comprising:
moving the coupling device at a first height towards the open target duct and then transitioning the coupling device to a second height, wherein the first height is higher than the second height, and wherein the second height is substantially the same height as the height of the open target duct.

8. The method according to claim 1, further comprising:
moving, if it is determined that the open target duct is present in the scene, the imaging system along a trajectory such that the open target duct remains present in the scene.

9. The method according to claim 1, further comprising:
moving the imaging system together with the coupling device, wherein the relative position of the imaging system with respect to the coupling device remains substantially the same.

10. The method according to claim 1, wherein the open target duct comprises a flange.

11. The method according to claim 10, wherein the characteristic property of the open target duct comprises information on a plurality of holes in the flange.

12. The method according to claim 1, further comprising:
moving, if the estimated position of the open target duct has been determined, the imaging system along a trajectory such that the orientation of the open target duct with respect to the imaging system changes;
capturing additional images of the scene, while the imaging system moves; and
improving, based on the additional images of the scene captured, a representation accuracy of the representation or the 3D representation of the open target duct.

13. The method according to claim 12, further comprising:
improving, based on the 3D representation of the open target duct with the improved representation accuracy, a position accuracy of the estimated position of the open target duct with respect to the coupling device or the imaging system.

14. A marine loading system comprising:
a marine loading arm comprising:
at least one fluid transfer line provided with a coupling device;
at least one actuator being adapted to move the marine loading arm and to position the coupling device;
an imaging system configured to capture a plurality of images, wherein the position and orientation of the imaging system with respect to the coupling device is determinable; and
a control system operatively connected to the at least one actuator and to the imaging system, wherein the control system is configured to:

a) receive, from the imaging system, image data associated to the plurality of images of a scene;

b) construct, based on the image data, a representation of an object in the scene;

c) determine, based on matching the representation of the object in the scene with a plurality of predetermined representations comprising representations of open target ducts, whether the object represents an open target duct being present in the scene;

d) determine, if the open target duct is present in the scene, an estimated position of the open target duct with respect to the coupling device;

e) construct, based on the image data, a 3D representation of the open target duct;

f) determine a characteristic property of the open target duct, based on matching the 3D representation of the open target duct with a plurality of predetermined 3D representations comprising 3D representations of open target ducts with predetermined characteristic properties;

g) determine, based on the determined characteristic property of the open target duct, whether the coupling device is compatible with the open target duct, wherein a coupling device is compatible with the open target duct if the coupling device can be connected to the open target duct; and h) control, if the coupling device is compatible with the open target duct, the at least one actuator to move the coupling device towards the open target duct, based on the estimated position of the open target duct with respect to the coupling device.

15. The marine loading system according to claim 14, wherein the characteristic property of the open target duct comprises information on a diameter of the open target duct.

16. The marine loading system according to claim 14, wherein the open target duct comprises a flange.

17. The marine loading system according to claim 16, wherein the characteristic property of the open target duct comprises information on a plurality of holes in the flange.

18. The marine loading system according to claim 14, wherein the control system is further configured to:
    determine, after step c and before step d, based on matching the objects in the scene with a plurality of predetermined representations comprising representations of closed target ducts, whether the object represents a closed target duct being present in the scene.

19. The marine loading system according to claim 14, wherein the control system further is configured to:
    generate a first signal, indicating whether the property of the open target duct is determined; and/or
    generate a second signal, if the property of the open target duct is determined, the second signal indicating whether the coupling device is compatible with the open target duct.

20. The marine loading system according to claim 14, wherein the control system further is configured to:
    repeat steps b to e for every object in the scene;
    generate a third signal, indicating a number of open target ducts that are present in the scene; and
    select, if the number of open target ducts is greater than one, the open target duct to which the coupling device should connect.

21. The marine loading system according to claim 14, wherein the control system further is configured to:
    receive, after step h, a detailed image data associated to at least one detailed image of the open target duct; and
    determine whether the open target duct has defects, based on the detailed image data and on matching the detailed image data with image defect data associated to a plurality of predetermined images of open target ducts with defects and a plurality of predetermined images of open target ducts without defects.

22. The marine loading system according to claim 14, wherein the control system further is configured to:
    control the at least one actuator to move the coupling device at a first height towards the open target duct and then transitioning the coupling device to a second height, wherein the first height is higher than the second height, and wherein the second height is substantially the same height as the height of the open target duct.

23. A non-transient computer readable medium containing program instructions for a control system of the marine loading system according to claim 14, to cause the control system to perform steps a to h.

24. A computer program comprising computer instructions which, when loaded in a control system of the marine loading system according to claim 14, cause the control system to perform steps a to h.

25. The marine loading system according to claim 14, further comprising means to move the imaging system.

26. The marine loading system according to claim 25, wherein the imaging system is mounted on the marine loading arm, on a drone and/or on a movable arm.

27. The marine loading system according to claim 25:
    wherein the control system further is configured to let, if it is determined that the open target duct is present in the scene, the imaging system move along a trajectory such that the orientation of the open target duct with respect to the imaging system changes;
    wherein the imaging system further is configured to capture additional images of the scene, while the imaging system moves; and
    wherein the control system further is configured to improve, based on the additional images of the scene captured, a representational accuracy of the representation or the 3D representation of the open target duct.

28. The marine loading system according to claim 27, wherein the control system further is configured to:
    improve, based on the 3D representation of the open target duct with the improved representation accuracy, a position accuracy of the estimated position of the open target duct with respect to the coupling device or the imaging system.

* * * * *